Jan. 12, 1960 T. M. COLE 2,921,240

PANEL MOUNTINGS FOR PLUG-IN CIRCUIT BREAKERS AND CIRCUIT BREAKERS WITH PLUG-IN TERMINALS

Filed Jan. 19, 1953 3 Sheets-Sheet 1

INVENTOR.
THOMAS M. COLE
BY Edwin Leinohn & Harry Cohen
ATTORNEYS

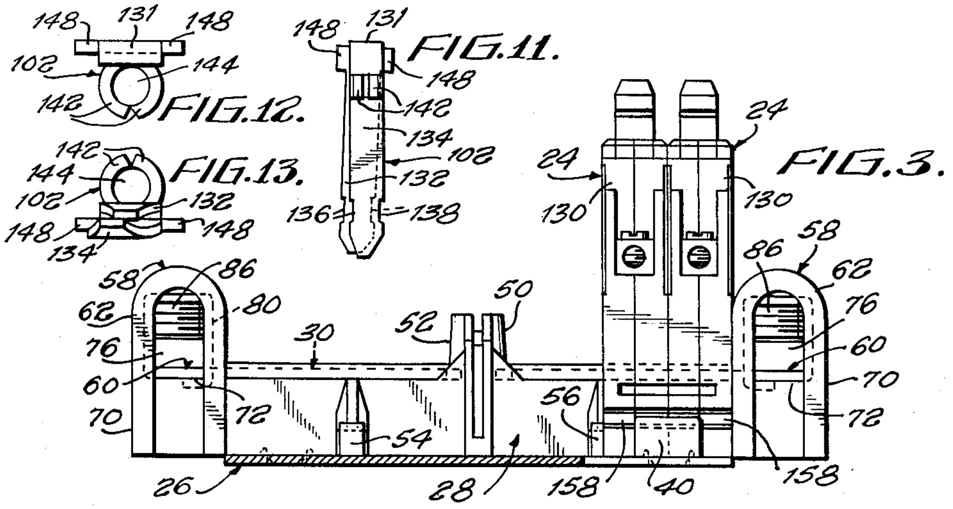
FIG. 11, FIG. 12, FIG. 13, FIG. 3
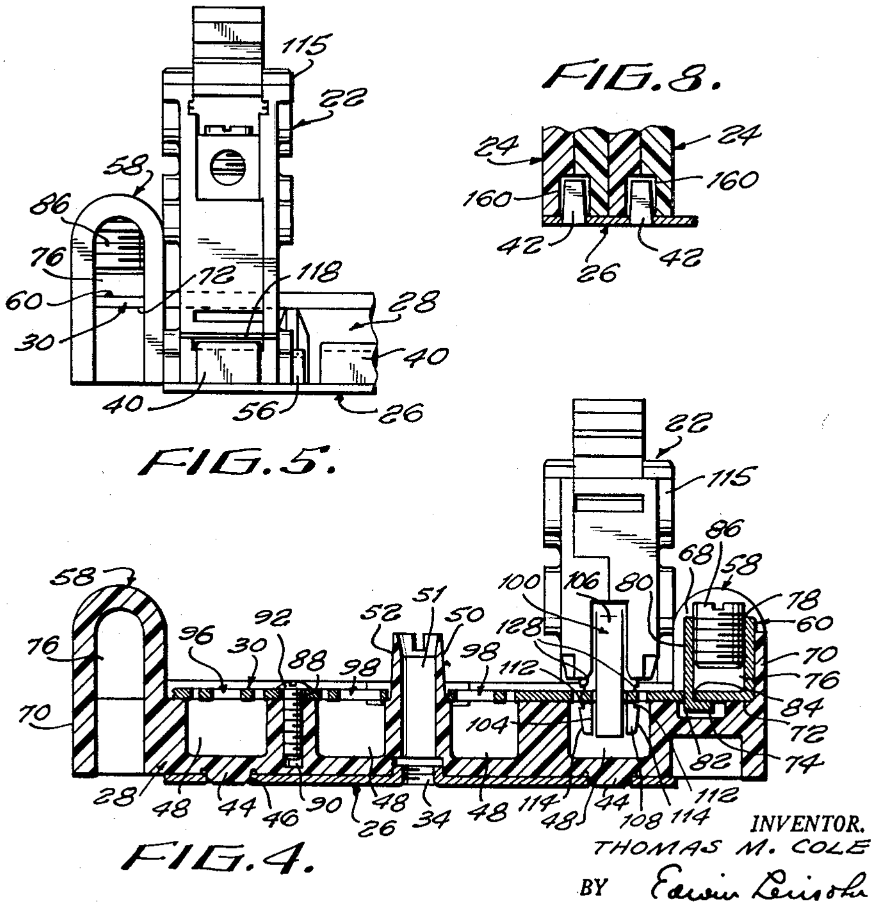
FIG. 5, FIG. 8, FIG. 4
FIG. 4.
INVENTOR.
THOMAS M. COLE
BY Edwin Leisohn &
Harry Cohen
ATTORNEYS Jan. 12, 1960 T. M. COLE 2,921,240

PANEL MOUNTINGS FOR PLUG-IN CIRCUIT BREAKERS AND CIRCUIT BREAKERS WITH PLUG-IN TERMINALS

Filed Jan. 19, 1953 3 Sheets-Sheet 3

INVENTOR.
THOMAS M. COLE
BY Edwin Leisohn & Harry Cohen
ATTORNEYS

United States Patent Office 2,921,240
Patented Jan. 12, 1960

2,921,240

PANEL MOUNTINGS FOR PLUG-IN CIRCUIT BREAKERS AND CIRCUIT BREAKERS WITH PLUG-IN TERMINALS

Thomas M. Cole, Harrison, N.Y., assignor to Federal Pacific Electric Company, Newark, N.J., a corporation of Delaware Application January 19, 1953, Serial No. 331,871

11 Claims. (Cl. 317—119)

This invention relates generally to a panel mounting arrangement or panelboard construction for circuit breakers of the type which are provided with plug-in or stab terminals which both mechanically lock and electrically connect the circuit breakers to terminals provided on the panelboard.

A panelboard arrangement of this general type is illustrated in Patent No. 2,599,695, dated June 10, 1952, to Paul M. Christensen and assigned to the assignee hereof. In said patent provision is made for mounting a plurality of circuit breakers, all of which are substantially of the same width, in side-by-side disposition on a mounting pan. The subject matter of the present application is related also to the copending application of myself and Paul M. Christensen, filed November 15, 1949, and which issued as Patent No. 2,647,225 on July 28, 1953, said patent disclosing and claiming a panel board construction for mounting in side-by-side disposition circuit breakers which are substantially of the same width.

Pursuant to the present invention, and as a primary object thereof, the panelboard is provided with means allowing for various different mounting arrangements thereon of circuit breakers of different widths, respectively, wherein, in each arrangement thereof, the circuit breakers are mounted in side-by-side disposition on the mounting pan.

Another object is the provision, in a panelboard assembly, of means to mount alternatively in side-by-side disposition, a first group of circuit breakers of a first predetermined width, or a second group of circuit breakers of a second predetermined width, or a third group comprised of circuit breakers of both said widths, respectively.

Another object is the provision in a panelboard assembly of terminal members adapted for engagement by companion stab terminals, wherein each of said terminal members has provision for accepting stab terminals which differ in general conformation and dimensions.

A further object is the provision of a generally improved and simplified stab terminal element for a circuit breaker or the like.

The above and other objects, features and advantages of the present invention will be more fully understood from the following description considered in connection with the accompanying illustrative drawings.

In the drawings:

Fig. 3 is a view, partially in elevation and partially in section, taken on the line 3—3 of Fig. 1;

Fig. 4 is a sectional view taken on the line 4—4 of Fig. 1;

Fig. 5 is a fragmentary view, in elevation, taken on the line 5—5 of Fig. 1;

Fig. 8 is a fragmentary sectional view taken on the line 8—8 of Fig. 2;

Fig. 11 is a perspective view of a stab terminal pursuant to the present invention;

Fig. 12 is a top plan view of Fig. 11; and

Fig. 13 is a bottom plan view of Fig. 11.

Figures 1, 2:
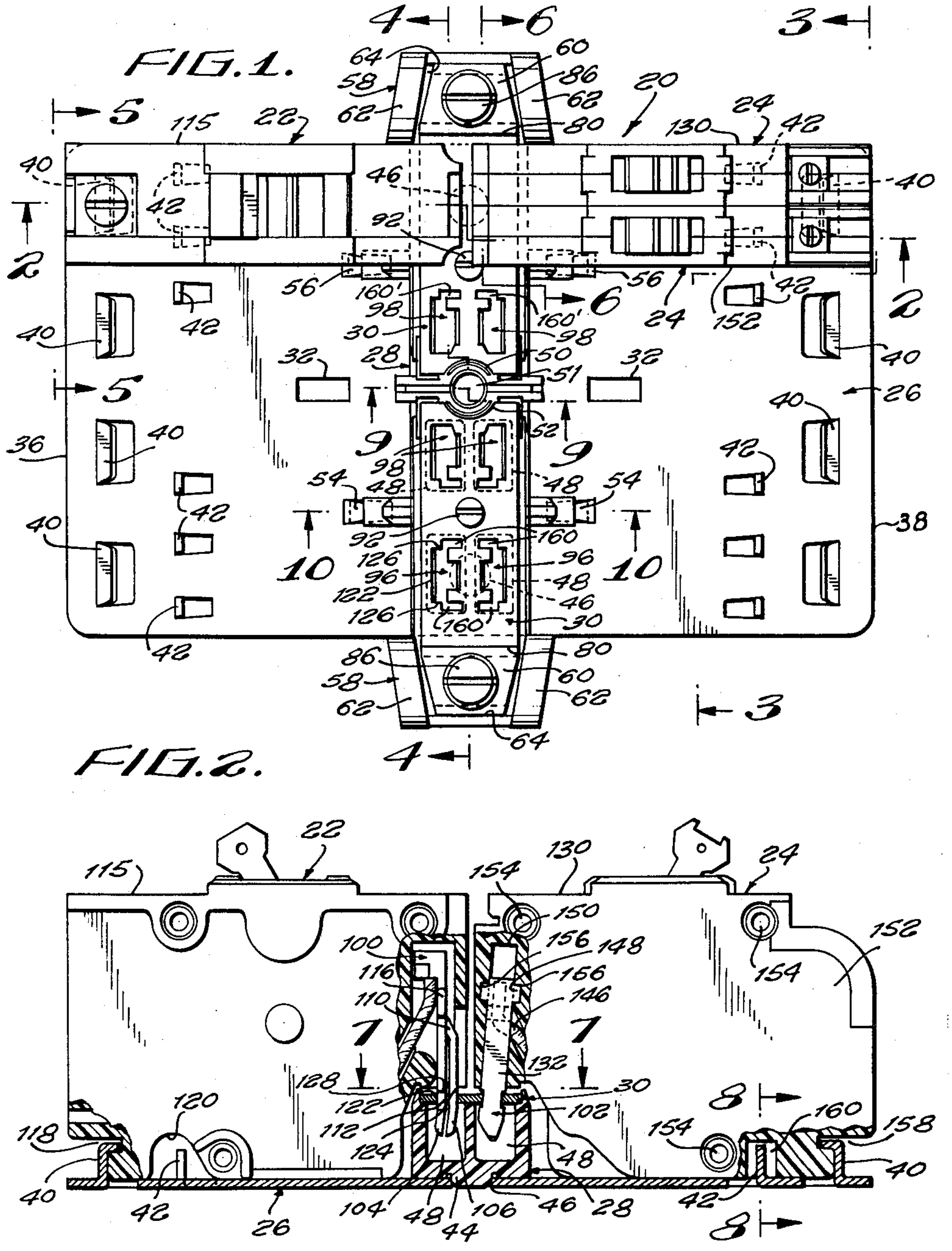
Fig. 1 is a plan view of a panel mounting arrangement pursuant to the present invention and illustrates a plurality of circuit breakers of different widths, respectively, in position on the mounting pan.
Fig. 2 is a view, partially in elevation and partially in section, taken on the line 2—2 of Fig. 1.

Referring now to the drawings in detail, there is shown a panelboard or panel mounting assembly 20, which is adapted to accommodate circuit breakers of the plug-in or stab terminal type, such as are indicated at 22 and 24, respectively. As here shown, the panelboard comprises the mounting pan 26 which is provided substantially centrally, and transversely thereof, with the insulated base or terminal block member 28, said block member mounting the terminal members 30—30.

The mounting pan 26 is preferably a sheet metal member which, as here shown, is adapted for use with an elevating mechanism such as is illustrated and claimed in the previously identified patent to Christensen. In this connection, it will be noted that the pan 26 is provided with the laterally spaced centrally disposed slots 32—32 which are adapted to receive companion guide members, such as are indicated at 58—58 in Fig. 3 of said patent. As therein shown, said guide members are provided on the rear wall of a suitable enclosure for the mounting pan. Intermediate said slots 32—32, the pan 26 is provided with an integral upwardly extending hollow boss 34 (Figs. 4 and 9) which is internally threaded for threaded engagement with the operating member of the elevating mechanism, such as is indicated at 40 in said patent, for adjustably disposing the pan within its enclosure, as described in said patent. However, it will be understood that, insofar as various novel features of the present invention are concerned, as hereinafter described in detail, they are not limited to a mounting pan adapted to be provided with an elevating mechanism or in an enclosure, but on the contrary the pan 26 need not be adjustably mounted, or it may be otherwise adjustably mounted within a suitable enclosure, as well known to those skilled in the art.

Inwardly of each of the opposing marginal edges 36 and 38 thereof, the pan 26 is provided with a row of struck-up hooked portions 40. As here shown, and as presently constructed, there are four hooks 40 at each end of the mounting pan, said hooks being equally spaced in each row thereof. Inwardly of each row of the hooks 40, the pan is provided with a row of struck-up portions or detents 42. As here shown, each row of detents comprises a group of three laterally aligned detents which is spaced from a similar group of three laterally aligned detents, each of the detents in each group being equally spaced.

The block 28 extends transversely of the pan 26, being disposed centrally thereof and parallel to the previously mentioned rows of hooks 40 and detent elements 42, respectively. Said base member 28 is provided with the downwardly projecting nibs 44 (Fig. 4) which engage in companion apertures 46 provided in the mounting pan 26 for retaining the block in position thereon. Extending longitudinally thereof, the block is provided with the four equally spaced open ended recesses 48, the function of which will presently appear. Centrally thereof, the block is provided with the arcuate raised barrier portions 50—52 (Figs. 1, 4 and 9) which define a vertically extending opening or passageway 51 above the boss 34 for the previously mentioned operating member of the elevating mechanism. Said barrier portions also extend laterally of the block member, on each side thereof, as is best illustrated in Fig. 1. Provision is also made for the additional laterally extending barriers 54 and 56, on each side, respectively, of said centrally disposed barrier portions, and equally spaced therefrom as best illustrated in said Figure 1. At each end thereof, the base 28 is provided with a part 58 which forms a housing or support for the line terminal connector 60 of the terminal member 30. Said housing 58 comprises the spaced arms 62—62 (Fig. 10) which curve upwardly from the base member and define a chamber 64 therebetween, said chamber being open at the front 68 thereof, as best illustrated in Fig. 4, and said arms curving downwardly and merging to form the rear wall 70 of said chamber. It will be noted that the chamber is provided with a floor 72 having a recessed portion 74 defined therein, and further that the chamber is open at both sides 76—76 thereof.

The line terminal connector 60 preferably is an integral portion of the conducting strap or terminal member 30 and extends into the chamber 64 through its open end 68, and abuts the rear wall 70 thereof. Said connector is bent upwardly as at 76, reflexed as at 78, and then bent downwardly as at 80, a narrowed end portion 82 passing through a slot 84 in the strap, and then being bent upwardly to abut the under surface of the strap. Said end portion 82 is disposed in the previously mentioned recess 74 defined in the block 28. A terminal screw 86 threadedly engages the reflexed or cross portion 78 and the confronting surfaces of portions 76 and 80, as best illustrated in Fig. 4. It will be apparent that a lead from one side of the power source may be readily inserted through an opening 76 and disposed in the terminal connector 60 for connecting the terminal member 30 to the powerline, said lead being releasably retained therein by said terminal screw.

In order to secure each of the terminal straps 30 to the underlying base 28, the straps are each provided with an aperture 88 (Fig. 7) which overlies or registers with a threaded opening 90 (Fig. 10) defined in the base 28. A screw 92 extends through said aperture into the openings to secure the strap 30 in position on the base 28. In addition it will be noted that each strap is provided with the arcuately notched portion 94 to accommodate the adjacent arcuate barrier portion 50 or 52, as the case may be, on the base 28, as best illustrated in Fig. 1.

Figures 6, 7, 9, 10:
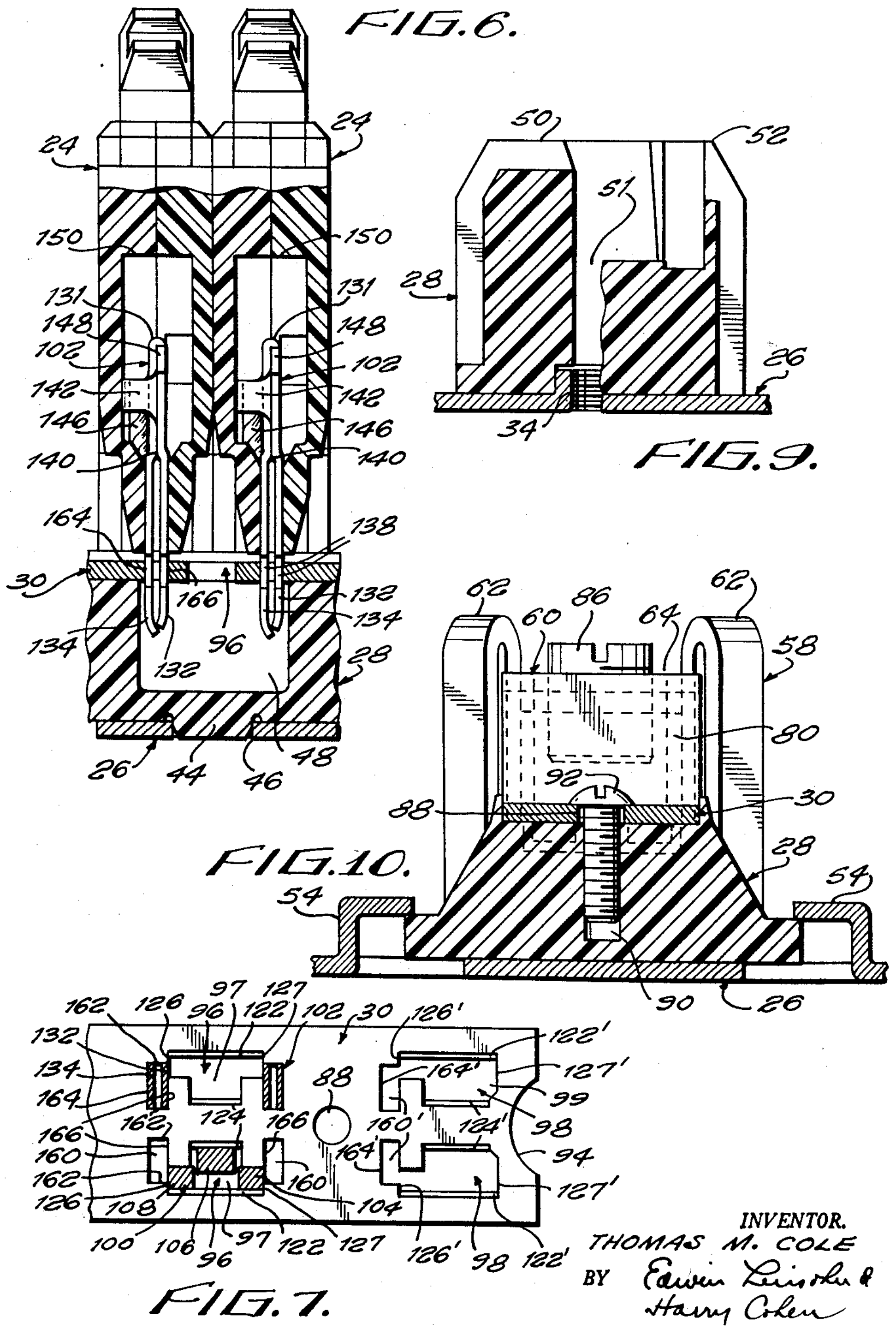
Fig. 6 is a fragmentary sectional view, on an enlarged scale, taken on the line 6—6 of Fig. 1.
Fig. 7 is a fragmentary sectional view, on an enlarged scale, taken on the line 7—7 of Fig. 2.
Fig. 9 is a fragmentary sectional view, on an enlarged scale, taken on the line 9—9 of Fig. 1.
Fig. 10 is a fragmentary sectional view, on an enlarged scale, taken on the line 10—10 of Fig. 1.

Pursuant to one of the important features of the present invention, the terminal member 30 is provided with a pair of confronting substantially E-shaped contact slots 96, and with the pair of confronting substantially L-shaped contact slots 98, as best illustrated in Fig. 7. Each of said contact slots overlies a base recess 48, is aligned with a hook 40, and is adapted to receive alternatively the plug-in or stab terminal 100 (Figs. 2, 4 and 7) provided on the previously mentioned circuit breaker 22, or the plug-in or stab terminal 102 (Figs. 2, 6, 7 and 11) provided on the previously mentioned circuit breakers 24, as hereinafter described in detail.

The stab contact or plug-in terminal 100 is preferably of the type which is illustrated and claimed in the copending application of Thomas M. Cole, Serial No. 127,432, filed November 15, 1949, and assigned to the assignee hereof. Said stab contact 100 is preferably made in one piece of bronze or other suitable conducting material, and is provided with the axially extending prongs or stab elements 104, 106 and 108, it being noted from Fig. 2 that the outer prongs 104 and 108 lie within the same plane and that the intermediate prong 106 extends forwardly of said outer prongs from the bend 110 therein, to lie within a plane offset laterally of said first mentioned plane. It will be noted that at their free end portions, the intermediate and the outer prongs taper in opposite directions, respectively. Each of said outer prongs is notched or recessed in the outer edge thereof, as at 112, and said edge is tapered, as at 114 below the notch. The stab 100 is suitably mounted in the two-part insulated casing 115 of the circuit breaker 22, it being noted that the stab is provided with laterally extending portions or tabs 116, only one of which is illustrated in Fig. 2. It will be understood that said laterally extending tabs are suitably retained by cooperating portions of the casing 115, whereby the stab is disposed substantially vertically therein and projects therefrom, as illustrated in Fig. 2, and as fully described and illustrated in said co-pending application of Thomas M. Cole.

The circuit breaker housing or casing 115 is provided, at the end thereof opposite the stab 100, with a transversely extending recess 118 (Figs. 2 and 5), which recess is closed at both ends thereof. Between the ends thereof, the casing is provided with a recess 120 defined in the bottom wall thereof, the function of which will presently appear. In order to mount a circuit breaker 22 on the mounting pan 26, the circuit breaker is first tilted, with its stab up, so that a hook 40 will engage in the recess 118, it being understood that the stab thereof will be disposed above one of the contact slots 96 or 98, as the case may be, so that when the stab is urged downwardly, it will automatically enter the underlying contact slot and extend therethrough into an underlying recess 48 in the base 28, as best illustrated in Figs. 2 and 4. With the stab 100 engaged in one of the contact slots, the bottom wall of the casing is disposed on the mounting pan.

Referring now to Fig. 7 in detail, it will be noted that the contact slot 96 of the member 30 is provided with the opposed beveled edge portions 122 and 124. The edge 124 cooperates with the previously mentioned taper on the intermediate prong 106, and the edge 122 cooperates with the tapering on the prongs 104 and 108, whereby to facilitate the entry of the stab into the slot. The marginal portions 126 and 127 of the contact slot 96 at each end of the bevel 122 thereof, are so spaced from each other, as to cause the outer prongs 104 and 108, when engaging said portions 126 and 127, respectively, upon the insertion of the stab, to flex together, whereby the notches 112—112 thereof will snap into frictional engagement with the edge portions 126 and 127, respectively, of the contact slot to releasably lock the stab in position therein. The penetration of the stab into the underlying recess 48 is limited by a shoulder 128 formed in the outer edge of each of the outer prongs. Upon said entry of the stab contact 100 into the central portion 97 of the E-shaped slot contact 96, the rear surfaces of the outer prongs 104 and 108 frictionally engage the beveled edge 122, and the front surface of the intermediate prong 106 frictionally engages the opposing beveled edge 124, as best illustrated in Fig. 7. It will be understood that the thickness of the stab contact is somewhat greater than the distance between the beveled edges, so that the intermediate prong 106 wil flex rearwardly toward the outer prongs, whereby the prongs will apply a resiliently firm contact pressure against the beveled slot edges to maintain good electrical contact and to prevent lateral movement of the stab contact, the vertical disengagement thereof being prevented by the aforesaid notch engagement. It will be noted that the stab contact makes electrical contact with four rectangularly related edge portions of the slot contact 96, namely, the opposing beveled portions 122 and 124, and the opposing edge portions 126 and 127, the notches in the outer prongs 104 and 108 engaging said latter edge portions, the intermediate prong 106 engaging the beveled edge portion 124, and the outer prongs 104 and 108 also engaging the beveled edge portion 122. It will be noted from Figs. 1 and 2 that with the circuit breaker 22 disposed on the pan as described above, the recessed portion 120 of the casing 115 clears the projections 42.

As previously indicated, the stab contact 100 is also adapted to be inserted into the L-shaped contact slot 98 of the strap 30. In this connection, it will be noted that the slotted contact 98 is also provided with the opposing beveled portions 122′ and 124′ which are substantially similar to the beveled portions 122 and 124 and which function in the same manner. In addition, provision is made for the marginal edge portion 126′ which is substantially similar to the marginal edge portion 126 and which serves the same purpose as the latter. However, in place of the short marginal edge portion 127, provision is made for a marginal edge portion 127′, which is longer than said previously mentioned marginal edge portion, and which comprises one end of the slotted contact 98. However, the distance between the opposing edge portions 126′ and 127′ of slot 98 is the same as the distance between the opposing edge portions 126 and 127 of slot 96 so that the edge portions 126′ and 127′ also serve to flex the spaced prong elements 104 and 108 toward each other and similarly serve to engage within the notches in said latter prong portions to releasably lock the stab contact 100 therein in exactly the same manner as the stab contact is locked within the contact slot 96. Therefore, it will be apparent that the leg portion 99 of the L-shaped contact slot 98 provides for four sided electrical engagement with the stab 100, in the same manner as the slot 96.

Referring now to the circuit breakers 24, it will be noted from Fig. 1, that the width of each of said circuit breakers is substantially one half of the width of the circuit breaker 22. As presently constructed, each circuit breaker 22 is substantially one inch wide and each circuit breaker 24 is substantially one-half inch wide. In addition, it will be noted that although the stab contact 100 of the circuit breaker 22 is disposed therein substantially in a plane which extends transversely of its casing 115, the stab contact 102 of the narrower circuit breaker 24 is disposed substantially within the plane of the two-part insulated casing 130 of the latter.

Referring now to Figs. 11, 12 and 13 in detail, it will be noted that the stab contact 102 is formed from a strip of suitable conducting material, and that said strip is bent upon itself as at 131, to form the companion prong or stab elements 132 and 134. Moreover, as best illustrated in Fig. 11, it will be noted that said prong elements are laterally offset from each other, so as to only partially overlap each other, in the normal condition thereof, so that when said prong elements are urged in opposite directions, respectively, for full mutual overlapping thereof, due to the inherent resiliency of the strip material each prong will be biased for return to the normal position thereof, illustrated in said figure. It will also be noted that each prong element is notched in both side edges thereof, as at 136 and 138 and furthermore that said side edges mutually taper at the free end of each prong element. In addition, it will be noted that the free end of each prong element is curved or rounded toward the companion prong, as best illustrated in Fig. 6. It will also be noted from said figure, that the upper portions of each of said prong elements are substantially in face-to-face abutment, and that said prong elements are each bowed outwardly from a fulcrum portion 140. Integral portions of the prong elements 134, as indicated at 142—142 are curved toward each other to form a recess or opening 144 for receiving therein one end of a flexible conductor 146. It will be understood that said portions 142—142 are crimped into firm mechanical and electrical engagement with said flexible conductor 146 and that the other end of said conductor is suitably connected to the circuit breaker mechanism within the circuit breaker 24. The other prong 132 is provided with the laterally extending ears or tabs 148—148 which constitute mounting portions for mounting the stab contact 102 within the casing 130 of the circuit breaker 24. In this connection, it will be understood that the casing 130 comprises an insulated body part 150 and a companion insulated cover part 152, which are suitably retained in housing defining relation, as by the through rivets 154. The body part 150 is provided with companion recesses or formations 156—156 for receiving the mounting portions 148—148, respectively, of the stab contact 102 for mounting the latter, as illustrated in Fig. 2. In addition, the housing 130 is provided with an open ended slot 158 adapted to receive a portion of the hooked member 40, of the mounting pan 26. It will also be noted that an open recess 160 is defined in the housing 130 for receiving one of the upstanding members 42 of the mounting pan 26.

As previously indicated, each of the slotted contacts 96 and 98, respectively, can also accommodate the stabs 102. As here shown, the slotted contact 96 is adapted to simultaneously accommodate two of the stabs 102, and the slotted contact 98 is adapted to accommodate one of the stabs 102. More specifically, it will be noted that the E-shaped slotted contact 96 is provided with a substantially rectangular slot portion 160—160, at each end thereof. Each slot portion 160 is defined by the opposing marginal edge portions 162—162, and by the opposing marginal edge portions 164 and 166. Upon insertion of a stab contact 102 into the slotted portion 160 of a contact slot 96, the opposing notches 136 and 138 in each of the prongs will snap into engagement with the opposing marginal edges 162—162. It will be understood that the distance between the marginal edges 162—162 is such as to cause the prong elements to be forced into full overlapping relationship, as best illustrated in Fig. 2. As previously indicated, when forced into full overlap, said prongs are biased outwardly in opposite directions to provide spring pressure against the opposing edges 162—162 whereby to mechanically lock the prongs, at the notches thereof, in the slotted portion 160, as well as to provide good electrical engagement with said edges. In addition, it will be noted from Fig. 7 that the outer face of the prong elements 132 will engage the marginal edge portion 166, and the outer face of the prong element 134 will engage the opposing marginal edge portion 164. In this connection, it will be understood that the distance between said lateral opposing edges is such as to force the companion prong elements to pivot toward each other about the portion 140, as a fulcrum, so that due to the inherent resiliency of the strip material a spring pressure is applied against said opposing marginal edges. Consequently, it will be readily apparent that the stab contact 102 also provides for a four sided electrical and mechanical engagement in the slotted contact portion 160.

As previously indicated, the slotted contact 96 is provided with two spaced slotted portions 160—160 in order to accommodate two of the narrower circuit breakers 24 in side-by-side disposition, as illustrated in Figs. 1 and 3. However, the slotted portion 98, as here shown, is provided with only one of the rectangularly slotted portions 160′ which is similar in all respects to the slotted portion 160. It will be noted that the contact portion 160′ is on the side of the slotted contact 98 which is adjacent the laterally aligned slotted contact 96. In the present embodiment of the invention, provision is omitted at the other end of the contact 98 for accommodating a stab contact 102 in order to accommodate the previously mentioned arcuate barrier portions 50 or 52, as the case may be. However, it wil be understood that if provision for the elevating mechanism of the Christensen patent is omitted, the slotted contacts 98 may be substantially similar to the slotted contacts 96.

In order to mount a circuit breaker 24 on the mounting pan 26, the circuit breaker is first tilted in order to insert a hooked element 40 into the open ended recess 158 (Figs. 2 and 3) formed in the casing thereof. The stab end of the circuit breaker is then urged downwardly to engage the stab 102 into one of the slotted contact portions 160 or 160′ as the case may be. It will be noted that the hook 40, which is wider than the recess 158, will prevent movement of the circuit breaker 24 in a direction which is normal to the plane of the mounting pan 26. However, in view of the fact that the recess 158 is open ended, the hook 40 will not serve to prevent lateral movement of the circuit breaker 24 in the same manner that it prevents lateral movement of the wider circuit breaker 22, since in the latter, as previously explained, the recess 118 is closed at the ends thereof. In order to prevent lateral movement of the circuit breaker 24, the upstanding member 42 is positioned within the recess 160, when the circuit breaker 24 is disposed on the pan 26, as illustrated in Figs. 2 and 8.

As previously indicated, the width of the circuit breaker 22 is substantially twice the width of the circuit breaker 24, and the arrangement of the hooks 40 and the slotted contacts 96 and 98 is such that flexible arrangements are possible for mounting the breakers on the pan 26. More specifically, it will be apparent that the pan 26, as presently constructed, pursuant to one arrangement can accommodate four of the wider circuit breakers 22 in side-by-side disposition thereof on each side of the insulated base 28. Each circuit breaker 22 will be disposed between one of the hooks 40 and the aligned slotted terminal contact 96 or 98, as the case may be, to provide for a maximum of eight of the circuit breakers 22, in the present embodiment, to be mounted on the pan 26. The barriers 56, 50—52, and 54 will be interposed between adjacent breakers 22 on each side of the pan 26.

Pursuant to another arrangement, the pan 26, as now constructed, can accommodate twelve of the narrower circuit breakers 24. As previously indicated, in view of the fact that each slotted contact 96 can accommodate two of the narrower circuit breakers 24, each of which will be engaged by the same hook 40 and by the opposing portions 160—160 of the same slotted contact 96, as illustrated in Fig. 1, this will account for eight circuit breakers 24 positioned on the mounting pan 26. In addition, each slotted leg portion 160′ of each L-shaped contact slot 98 can accommodate an additional circuit breaker 24 in side-by-side disposition with a circuit breaker which is accommodated by the adjacent portion 160 of the adjacent slotted contact 96, as will be apparent from Fig. 1. To provide for this arrangement, the upstanding members 42, in the present embodiment, are arranged in groups of three, as previously indicated. Therefore, it will be readily apparent that, as now constructed, the mounting pan 26 can accommodate a total of twelve of the narrower circuit breakers 24.

In addition, it will also be understood that various other arrangements comprising combinations of both of the wider circuit breakers 22 and the narrower circuit breakers 24 can be accommodated in the present embodiment. For example, and not by way of limitation, among these various combinations are four of the wider circuit breakers 22 and six of the narrower circuit breakers, or four of the wider circuit breakers and eight of the narrower circuit breakers, or nine of the narrower circuit breakers and two of the wider circuit breakers.

It will be apparent that the capacity of the pan 26 may be readily increased by increasing the size of the pan to permit for longer straps 30 having additional contact slots, additional hooks 40 and detents 42 being provided for this purpose.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. In combination, a plurality of circuit breakers and a terminal panel, said circuit breakers each having a casing provided with an engageable part and a stab electric terminal, the stab terminal of one of said breakers being of predetermined conformation and the stab terminal of another of said breakers being of a different conformation, said panel having means adapted to releasably engage said engageable parts of the circuit breaker casings, respectively, for holding said circuit breakers, and a conducting member provided on said panel, said member having a substantially E-shaped terminal slot defined therein, the end portions of said E being complementary to stab terminals of said predetermined conformation for effecting electric contact therewith, respectively, and the central portion of said E being complementary to said stab terminal of different conformation for effecting electric contact therewith, said stab terminals and said panel terminal portions being adapted to releasably interlock, whereby said holding means and said casing parts and said stab terminals and said terminal slot together cooperate to releasably mechanically lock said circuit breakers in position on said panel, and detent parts provided on said panel in alignment with the end portions, respectively, of said slots, for retaining against relative lateral movement the breakers engaged with said end portions, respectively.

2. In combination, a plurality of circuit breakers and a terminal panel, said circuit breakers each having a casing provided with an engageable part and a stab electric terminal, the stab terminal of one of said breakers being of predetermined conformation and the stab terminal of another of said breakers being of a different conformation, said panel having means adapted to releasably engage said engageable parts of the circuit breaker casings, respectively, for holding said circuit breakers, and a conducting member provided on said panel, said member having a substantially L-shaped terminal slot defined therein, the leg portion of said L being complementary to said stab terminal of said one breaker for effecting electric contact therewith, and the foot portion of said L being complementary to said stab terminal of said other breaker for effecting electric contact therewith, said stab terminals and said panel terminal portions being adapted to releasably interlock, whereby said holding means and said casing parts and said stab terminals and said terminal slot together cooperate to releasably mechanically lock said circuit breakers in position on said panel, and said panel having a detent part aligned with said slot foot portion for retaining against relative lateral movement the breaker engaged with said foot portion.

3. A prong terminal for an electric device comprising a strip of resilient material bent upon itself to form a pair of confronting elements normally disposed in partial overlapping relation and movable into substantially full overlapping relation to tension said elements for return to said normal disposition respectively, thereof, and said elements being bowed in opposite directions, respectively, whereby upon movement of said elements in a direction transverse to said first mentioned direction thereof, said elements are tensioned in said transverse direction.

4. In a terminal panel for circuit breakers having stab type terminals, that improvement which comprises a conducting member in which there is defined a terminal slot, said terminal slot having a first portion of predetermined conformation for engagement with a complementary breaker stab terminal and an additional portion with a different conformation for engagement with a breaker stab terminal complementary to said additional portion whereby to adapt said terminal slot for effecting electric contact alternatively with breaker stab terminals which differ in conformation, respectively, and said panel having a breaker holding part and a breaker detent part, said holding part being spaced laterally from said slot for engagement by a breaker engaged with either slot portion, and said detent part being disposed between said slot and holding part and offset from said holding part to releasably retain against lateral movement a breaker engaged with a predetermined one of said slot portions.

5. A terminal panel as set forth in claim 4, further defined in that the first terminal slot portion extends longitudinally of the conducting member and the additional slot portion extends transversely of said conducting member at one end of said first slot portion, said holding part being aligned with said terminal slot substantially for the longitudinal extent thereof, and said detent part being aligned with said transversely extending slot portion.

6. A terminal for an electric device comprising a resilient metallic strip bent upon itself to form a pair of confronting prong elements extending from the bend in said strip and having free ends remote from said bend, the respective axes of said elements from said free ends thereof to said bend being normally out of registry, and said free ends being movable edgewise relative to each other in substantially parallel planes in a direction toward registry of said axes for providing relatively heavy contact pressure when said terminal is driven into an aperture.

7. A terminal for an electric device comprising a resilient metallic strip bent upon itself to form a pair of confronting prong elements extending from the bend in said strip and having free ends remote from said bend, the respective axes of said elements from said free ends thereof to said bend being normally out of registry, and said free ends being movable edgewise relative to each other in substantially parallel planes in a direction toward registry of said axes for providing relatively heavy contact pressure when said terminal is driven into an aperture, each prong element being provided at the free end thereof with reverse marginal tapers.

8. In a terminal panel for circuit breakers provided with stab type terminals, that improvement which comprises a substantially rigid member of electrically conductive material, said member having formed in a substantially flat portion thereof and interiorly of the periphery thereof opposing longitudinal edge portions and opposing edge portions which extend transversely of said longitudinal edge portions to define therewith a longitudinal terminal slot having at least four substantially rigid side edge portions to provide for a four-sided electrical contact with a complementary stab terminal engaged therein, and additional opposing and transverse edge portions provided within said member and extending from one end of said longitudinal slot to define a substantially rigid four-sided lateral slot offset extending from and communicating with said longitudinal slot at said one end thereof, whereby to provide for four-sided electrical contact with a complementary stab terminal engaged in said lateral slot offset at one end of said longitudinal slot, said panel further having means to mechanically locate thereon and to retain in position thereon circuit breakers whose stab terminals are engaged in said longitudinal slot or in said lateral slot offset therefrom, said means being constituted by a breaker holding part and a breaker detent part, said holding part being spaced laterally of said longitudinal slot for engagement by a breaker engaged with either said longitudinal slot or said lateral slot offset, and said detent part being disposed between said lateral slot offset and said holding part to releasably retain against lateral movement a breaker engaged with said lateral slot offset.

9. In a terminal panel for circuit breakers provided with stab type terminals, that improvement which comprises a substantially rigid member of electrically conductive material, said member being formed in a substantially flat portion thereof and interiorly of the periphery thereof opposing longitudinal edge portions and opposing edge portions which extend transversely of said longitudinal edge portions to define therewith a longitudinal terminal slot having at least four substantially rigid side edge portions to provide for a four sided electrical contact with a complementary stab terminal engaged therein, and additional opposing and transverse edge portions provided within said member and extending from one end of said longitudinal slot to define a substantially rigid four-sided lateral slot offset extending from and communicating with said longitudinal slot at said one end thereof, and additional opposing and transverse edge portions provided within said member and extending from the other end of said longitudinal slot to define a substantially rigid four-sided lateral slot offset extending from and communicating with said longitudinal slot at said other end thereof, whereby to provide for four-sided electrical contact with complementary stab terminals engaged in said lateral slot offsets at each of the opposite ends of said longitudinal terminal slot, said panel further having means to mechanically locate thereon and to retain in position thereon circuit breakers whose stab terminals are engaged in said longitudinal slot or in said lateral slot offsets therefrom, said means being constituted by a breaker holding part and a pair of breaker detent parts, said holding part being spaced laterally of said longitudinal slot for engagement by a breaker engaged with either said longitudinal slot or said lateral slot offsets, and each detent part being disposed between one of said lateral slot offsets and said holding part to releasably retain against lateral movement a breaker engaged with the associated lateral slot offset.

10. In combination, a plurality of circuit breakers and a terminal panel, said circuit breakers each having a casing provided with an engageable part and a stab electric terminal, the stab terminal of one of said breakers being of predetermined conformation and the stab terminal of another of said breakers being of a different conformation, said panel having means adapted to releasably engage said engageable parts of the circuit breaker casings, respectively, for holding said circuit breakers, and a conducting member provided on said panel, said member having formed in a substantially flat portion interiorly of the periphery thereof and at a series of positions therein opposing longitudinal edge portions and opposing edge portions which extend transversely of said longitudinal edge portions to define therewith a series of longitudinal terminal slots each having at least four side edge portions to provide for a four-sided electrical contact with a complementary stab terminal engaged therein, and additional opposing and transverse edge portions provided within said member and extending from one end of each of said longitudinal slots to define at each of said positions a four-sided lateral slot offset extending from and communicating with said longitudinal slot at said one end thereof, whereby to provide for a four-sided electrical contact with a complementary stab terminal engaged in said lateral slot offset at one end of said longitudinal slot, certain of said plurality of circuit breakers having stab terminals of said predetermined conformation at certain of said positions and being engaged in the terminal slots thereat, and additional circuit breakers of said plurality of circuit breakers at others of said positions, said additional circuit breakers having stab terminals of said different conformation engaged in the respective lateral slot offsets at said other positions, and said means provided on said panel being operable to mechanically locate thereon and to retain in position thereon circuit breakers whose stab terminals are engaged in said longitudinal slot or in said lateral slot, said means being constituted by a breaker holding part and a breaker detent part, said holding part being spaced laterally of said longitudinal slot for engagement by a breaker engaged with either said longitudinal slot or said lateral slot offset, and said detent part being disposed between said lateral slot offset and said holding part to releasably retain against lateral movement a breaker engaged with said lateral slot offset.

11. In combination, a plurality of circuit breakers and a terminal panel, said circuit breakers each having a casing provided with an engageable part and a stab electric terminal, the stab terminal of one of said breakers being of predetermined conformation and the stab terminal of another of said breakers being of a different conformation, said panel having means adapted to releasably engage said engageable parts of the circuit breaker casings, respectively for holding said circuit breakers, and a conducting member provided on said panel, said member having formed in a substantially flat portion interiorly of the periphery thereof and at a series of positions therein opposing longitudinal edge portions and opposing side portions which extend transversely of said longitudinal edge portions to define therewith a series of longitudinal terminal slots each having at least four side edge portions to provide for a four-sided electrical contact with a complementary stab terminal engaged therein, and additional opposing and transverse edge portions provided within said member and extending from one end of each of said longitudinal slots to define at each of said positions a four-sided lateral slot offset extending from and communicating with said longitudinal slot at said one end thereof, and additional opposing and transverse edge portions provided within said member and extending from the other end of each of said longitudinal slots to define at each of said positions a four-sided lateral slot offset extending from and communicating with said longitudinal slot at said other end thereof, whereby to provide for four-sided electrical contact with complementary stab terminals engaged in said lateral slot offsets at each of the opposite ends of said longitudinal terminal slot, certain of said plurality of circuit breakers having stab terminals of said predetermined conformation at certain of said positions and being engaged in the terminal slots thereat, and additional circuit breakers of said plurality of circuit breakers at others of said positions, said additional circuit breakers having stab terminals of said different conformation engaged in the respective lateral slot offsets at said other positions, and said means provided on said panel being operable to mechanically locate thereon and to retain in position thereon circuit breakers whose stab terminals are engaged in said longitudinal slot or in said lateral slot offsets therefrom, said means being constituted by a breaker holding part and a pair of breaker detent parts, said holding part being spaced laterally of said longitudinal slot for engagement by a breaker engaged with either of said longitudinal slot or said lateral slot offsets, and each detent part being disposed between one of said lateral slot offsets and said holding part to releasably retain against lateral movement a breaker engaged with the associated lateral slot offset.

References Cited in the file of this patent

UNITED STATES PATENTS

| | | |
|---|---|---|
| 223,969 | Watts | Jan. 27, 1880 |
| 1,950,428 | Young | Mar. 13, 1934 |
| 2,117,816 | Ness | May 17, 1938 |
| 2,152,647 | Hubbell | Apr. 4, 1939 |
| 2,312,017 | Ackerman | Feb. 23, 1943 |
| 2,319,801 | Despard | May 25, 1943 |
| 2,332,766 | Von Gehr | Oct. 26, 1943 |
| 2,359,247 | Rowe | Sept. 26, 1944 |
| 2,533,483 | Losquadro | Dec. 12, 1950 |
| 2,559,943 | Cerny | July 10, 1951 |
| 2,599,695 | Christensen | June 10, 1952 |
| 2,640,185 | Alden | May 26, 1953 |
| 2,647,225 | Cole et al. | July 28, 1953 |
| 2,719,251 | Stewart | Sept. 27, 1955 |